Dec. 26, 1944.   L. STEIN   2,366,069
FLEXIBLE FASTENER FOR HAND LUGGAGE
Filed June 25, 1943   2 Sheets-Sheet 1
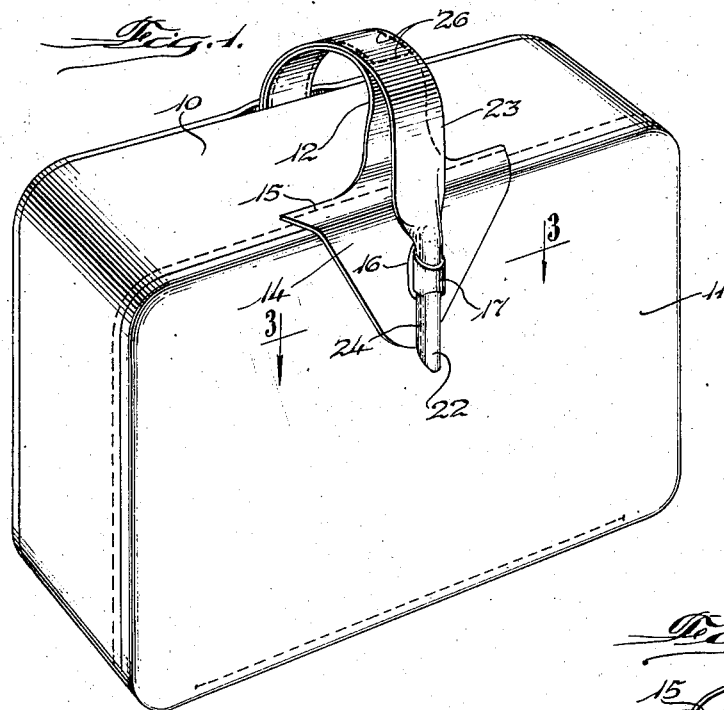
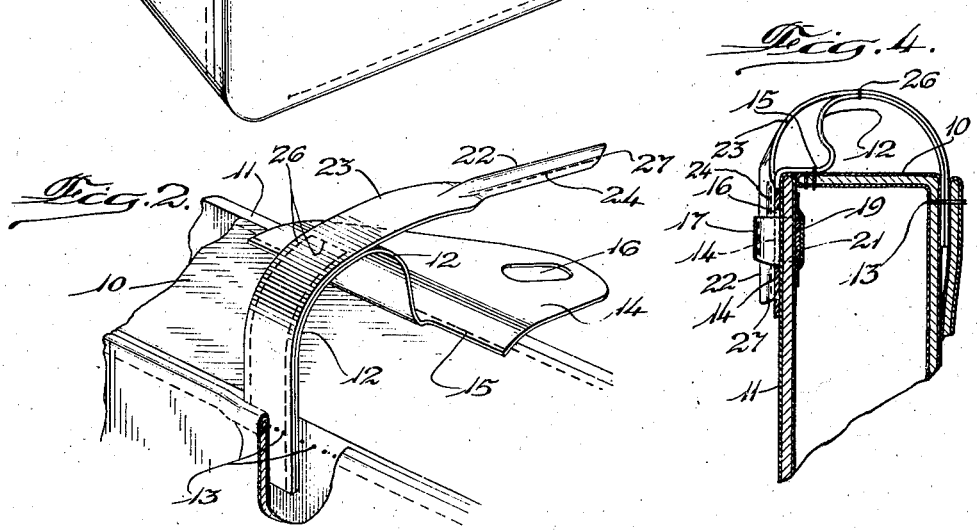
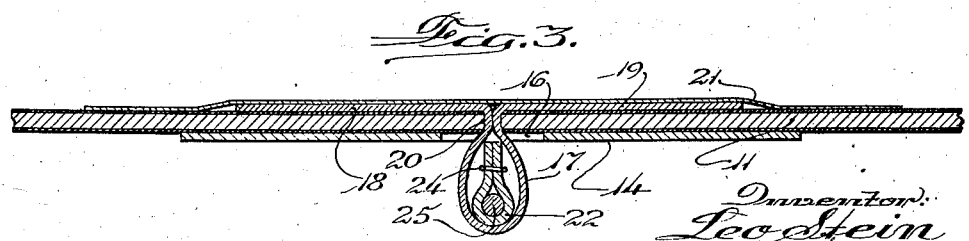
Inventor:
Leo Stein
By Barnett & Truman
Attorneys.

Dec. 26, 1944.                L. STEIN                 2,366,069
               FLEXIBLE FASTENER FOR HAND LUGGAGE
                   Filed June 25, 1943           2 Sheets-Sheet 2
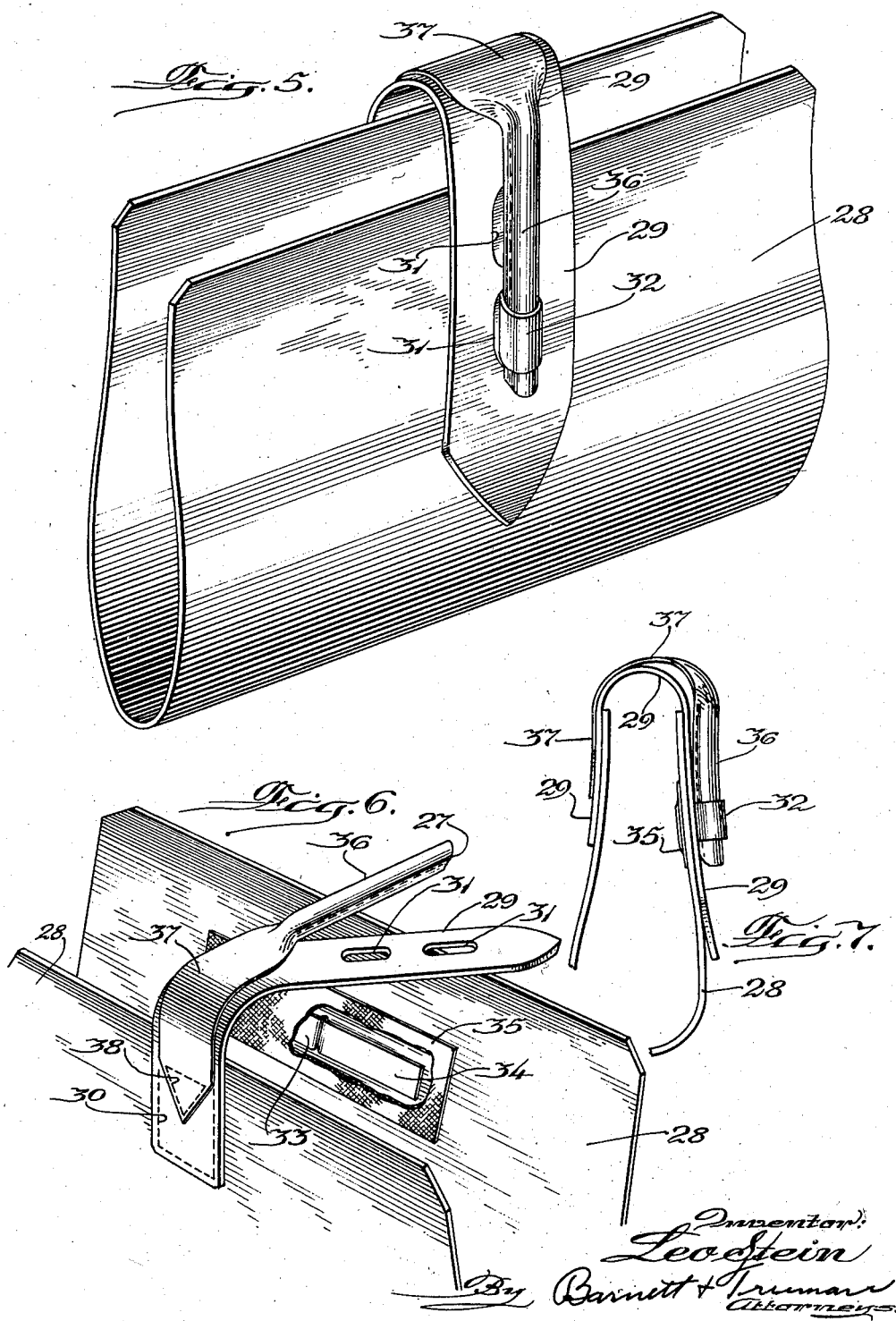

Patented Dec. 26, 1944

2,366,069

UNITED STATES PATENT OFFICE 2,366,069

FLEXIBLE FASTENER FOR HAND LUGGAGE

Leo Stein, Chicago, Ill.

Application June 25, 1943, Serial No. 492,225

7 Claims. (Cl. 292—283)

This invention relates to improvements in flexible fasteners and has for its principal object the provision of a flexible fastener of the general hasp and bolt type which will be suitable for use in various situations and which will be particularly suitable for fastening the closures of such containers as come within the general classification of handbags, portfolios, utility cases and the like.

A more specific object of the invention is to provide a flexible fastener of the hasp and bolt type in which the bolt member per se is made of flexible material but is relatively stiff so as to hold the closure member firmly in its closed position. In this connection, the invention contemplates the provision of a leather strip secured at one end to a portion of the case and having its free end folded upon itself lengthwise and having the meeting edges stitched together so that the folded portion will be of oval cross section and substantially stiffer than the other portion of the leather strip.

Another object of the invention is to provide a flexible fastener for hand bags and cases of the above general character in which the hasp portion of the fastener is united with the handle and in which the locking bolt of the fastener may also form a part of the handle.

A further object of the invention is to provide a fastener of the above general type which will be suitable for use on cases and other forms of hand containers and in which the fastener may assume a plurality of selected locking positions.

The invention is illustrated in connection with two specific embodiments in the accompanying drawings, wherein:

Fig. 1 is a view in perspective of a hand-case provided with the flexible fastener made in accordance with this invention.

Fig. 2 is a fragmentary view in perspective showing the rear of the case broken away so as to illustrate a preferred manner of attachment of the handle.

Fig. 3 is a fragmentary sectional view taken on line 3—3 of Fig. 1.

Fig. 4 is a fragmentary sectional view of the upper portion of the case shown in Fig. 1 to illustrate the close fitting engagement of the hasp with the lower edge of the bolt receiving loop.

Fig. 5 is a view in perspective illustrating one modification of the improved fastener which is particularly suitable for billfolds or other types of containers which normally require the fastening device to have a plurality of locking positions.

Fig. 6 is a fragmentary view in perspective illustrating the rear side and the inner face of the front side of the billfold shown in Fig. 5; and Fig. 7 is an end view of the device shown in Fig. 5.

Referring first to Figs. 1 to 4, inclusive, of the drawings, 10 designates a hand-case provided with a hinged side 11 adapted to swing outwardly and downwardly to its open position. The handle of the case includes a flexible strip of leather or other suitable material 12 which is stitched at one end to the rear face of the container, as shown at 13 in Fig. 2. The other end of the strip 12 is of triangular shape and is somewhat wider than the hand grip portion of the handle. The triangular portion is designated 14 and is stitched as indicated at 15 to the top of the case near the opening thereof. It will be seen, therefore, that the weight of the case is carried principally by the handle as secured to the rear side and top of the case by the stitchings 13 and 15. The free end serves as a hasp and is provided with an opening 16 adapted to fit over a loop member 17. The loop member is in the form of a leather strip folded upon itself with its free ends 18, 19 inserted through an opening 20 in the closure lid of the case (Fig. 3), and then folded back in opposite directions against the inner face of the lid. The free ends 18, 19 of said loop portion may be held in position by any suitable means, for example by means of an adhesive strip 21 which engages the ends 18, 19 of the loop and also the inner face of the lid. The portion of the loop 17 which extends through the opening 16 of the hasp preferably has its lower edges rounded so that the hasp portion 14, when in its locking position, will fit closely against the lower edge of the loop portion. A flexible bolt member 22 extends through the bolt receiving loop 17 to hold the closure lid 11 firmly in its closed position. The bolt member is formed by folding one end of the leather strip 23 upon itself in the direction of its length and stitching the meeting edges together as indicated at 24 so as to provide a relatively stiff portion. If desired, the folded portion of the bolt may include a central core 25 either of leather or more rigid material. The other end of the strip 23 is preferably stitched to the upper portion of the handle strip 12 as indicated at 26 so as to form a part of the handle. However, the bolt end of the strip 23 is not required to sustain any of the weight of the hand-case. In order to facilitate ready insertion of the bolt member 22, the lower end may be tapered as indicated at 27.

Referring now to Figs. 5 to 7, inclusive:

The particular form of container shown in these figures is not important. It is intended merely to illustrate a general situation in which it is desirable to provide a fastening device capable of having any one of a plurality of locking positions. In the modified embodiment the improved fastening device is shown in connection with a billfold 28. The hasp portion 29 of the fastener is secured by stitching 30 or other suitable means to the rear portion of the container, and the free end is provided with a plurality of openings 31 adapted to be selectively inserted over an outwardly projecting loop portion of a bolt receiving loop 32. The bolt receiving loop 32 consists of a leather strip folded upon itself to form the loop and having its free ends 33, 34 inserted through an aperture in the front portion of the container and folded in opposite directions against the inner face thereof. A strip of adhesive coated material 35 may be applied over the ends 33, 34 to overlap and engage the sides of the container so as to hold the loop strip in its applied position. The locking bolt, designated 36 herein, is preferably formed in substantially the same manner as described in connection with the preceding embodiment, but is preferably somewhat longer. For example, in the present case, the bolt should be long enough to extend the full length of the plurality of openings 31—31. The other end of the bolt strap 37 is stitched, as indicated at 38, or otherwise suitably secured to the rear portion of the hasp portion 29 at or adjacent the location where the said hasp is secured to the container. The bolt receiving loop 32 of the present modification, and likewise the similar loop 17 of the previous embodiment are made from leather stock of sufficient width and thickness to provide the desired flexibility transversely of the loop, but will maintain the loop relatively rigid in a vertical direction.

While the principles of the invention are illustrated herein in connection with two specific embodiments, it will be obvious that other modifications may be made without departure from the spirit of the invention. It will be understood, therefore, that the invention contemplates all such modifications as come within the scope of the appended claims.

I claim:

1. A flexible fastener of the hasp and bolt type for use on hand-cases and similar containers, said fastener comprising a bolt receiving member, a hasp portion of flexible material having an opening therein for receiving said bolt receiving member, and a bolt for insertion into said bolt receiving member to hold the hasp in its locking position; the said bolt comprising a strip of flexible material, one end of which is folded upon itself lengthwise and having its meeting edges secured together to form a tubular portion of greater rigidity than the other portion of the flexible strip.

2. A flexible fastener of the hasp and bolt type for use on hand-cases and similar containers, said fastener comprising a bolt receiving member, a hasp portion of flexible material having an opening therein for receiving said bolt receiving member, and a bolt for insertion into said bolt receiving member to hold the hasp in its locking position; the said bolt comprising a strip of flexible material, one end of which is folded upon itself lengthwise and having its meeting edges secured together to form a tubular portion and having a core inserted in said tubular member, whereby said tube will be of greater rigidity than the other portion of the flexible strip.

3. A flexible fastener of the hasp and bolt type for use on hand-cases and similar containers, said fastener comprising a bolt receiving member, a hasp portion of flexible material having an opening therein for receiving said bolt receiving member, and a bolt for insertion into said bolt receiving member to hold the hasp in its locking position; the said bolt comprising a strip of flexible material, one end of which is folded upon itself lengthwise and having its meeting edges secured together to form a tubular portion having a core of flexible material inserted in said tubular member, whereby said tube will be of greater rigidity than the other portion of the flexible strip.

4. In combination with a container having relatively movable portions for opening and closing the container, a loop member of flexible material secured to one movable portion of the container, a hasp of flexible material secured to an adjacent movable portion of the container and having an opening therein for receiving said loop, and a flexible bolt member for insertion through said loop member to hold the hasp in its locking position, the said hasp member having a portion which extends upwardly from said first mentioned attachment and then downwardly with its end secured to the container so as to form a loop shaped handle for the container, and the said bolt including a flexible strip secured to and strengthening said handle.

5. In combination with a container having relatively movable portions for opening and closing the container, a loop member of flexible material secured to one movable portion of the container, a hasp of flexible material secured to an adjacent movable portion of the container and having a plurality of openings adapted to selectively receive said loop, means providing a bolt for insertion through said loop member including a flat flexible strip portion adapted to be secured to said hasp adjacent its attachment to said container and having its other end folded upon itself in the direction of its length to provide said bolt.

6. In combination with a container having relatively movable portions for opening and closing the container, a loop member of flexible material secured to one movable portion of the container, a hasp of flexible material secured to another movable portion of the container and having an opening for receiving said loop and a flexible bolt member secured to said hasp and adapted to be inserted through said loop member to hold the hasp in its locking position; the said loop receiving member comprising a strip of flexible material of suitable width folded upon itself intermediate its ends and having its ends inserted through an opening in said container and turned in opposite directions and secured to the inner face thereof.

7. In combination with a container having relatively movable portions for opening and closing the container, a loop member of flexible material secured to one movable portion of the container, a hasp of flexible material secured to another movable portion of the container and having an opening for receiving said loop and a flexible bolt member secured to said hasp and adapted to be inserted through said loop member to hold the hasp in its locking position; the said loop receiving member comprising a strip of flexible material of suitable width folded upon itself intermediate its ends and having its ends inserted through an opening in said container and turned in opposite directions, and means comprising a strip of adhesive material applied over the end portions of said loop and adjacent portions of the container so as to secure the said end portions of the loop member to the inner face of the container.

LEO STEIN.